United States Patent
Miya et al.

(10) Patent No.: US 8,679,414 B2
(45) Date of Patent: Mar. 25, 2014

(54) DESULFURIZATION-DENITRATION APPARATUS FOR EXHAUST GAS

(75) Inventors: Masahiro Miya, Minato-ku (JP); Koji Ono, Minato-ku (JP); Junya Mochida, Minato-ku (JP)

(73) Assignee: J-POWER EnTech, Inc., Tokyo (JP)

( * ) Notice: Subject to any disclaimer, the term of this patent is extended or adjusted under 35 U.S.C. 154(b) by 904 days.

(21) Appl. No.: 12/679,426

(22) PCT Filed: Sep. 16, 2008

(86) PCT No.: PCT/JP2008/066634
§ 371 (c)(1),
(2), (4) Date: Mar. 22, 2010

(87) PCT Pub. No.: WO2009/038036
PCT Pub. Date: Mar. 26, 2009

(65) Prior Publication Data
US 2010/0233044 A1    Sep. 16, 2010

(30) Foreign Application Priority Data
Sep. 20, 2007  (JP) .................................. 2007-243332

(51) Int. Cl.
*B01D 53/08* (2006.01)
*B01J 8/12* (2006.01)

(52) U.S. Cl.
USPC ............... 422/177; 96/150; 96/152; 422/216; 422/220

(58) Field of Classification Search
USPC ............. 422/176, 177, 213, 216, 219, 220; 96/123, 150, 152; 55/474, 516, 518; 34/168, 174; 95/110; 414/216
See application file for complete search history.

(56) References Cited

U.S. PATENT DOCUMENTS
4,126,435 A * 11/1978 Reese ............................ 55/474

FOREIGN PATENT DOCUMENTS

| JP | 59-000329 | 1/1984 |
|---|---|---|
| JP | 5-261243 | 10/1993 |
| JP | 2006-015281 | 1/2006 |

* cited by examiner

*Primary Examiner* — Jill Warden
*Assistant Examiner* — Joye L Woodard
(74) *Attorney, Agent, or Firm* — Jordan and Hamburg LLP

(57) ABSTRACT

Adsorbent dust can be recovered while spraying is prevented. An apparatus is provided with a desulfurization-denitration tower body and an adsorbent discharging device. An entrance louver and an exit louver are provided for forming a packed moving bed of an adsorbent that moves downward inside the tower body, the apparatus has a throttle portion provided with a side panel that is inclined so that a spacing gradually decreases toward a discharging device, the throttle portion being provided between the tower body and the discharging device, and first partitions are provided inside the throttle portion. A second partition extending along the incline direction of the side panel is provided at a predetermined distance from the bottom end of the exit louver above the side panel, and a gap is provided between the bottom end part of the exit louver and the side panel of the throttle portion.

6 Claims, 10 Drawing Sheets

PRIOR ART

PRIOR ART

PRIOR ART

PRIOR ART

DESULFURIZATION-DENITRATION APPARATUS FOR EXHAUST GAS

BACKGROUND OF THE INVENTION

The present invention relates to a desulfurization-denitration apparatus for exhaust gas, and particularly relates to a desulfurization-denitration apparatus (hereinafter referred to as "dry desulfurization apparatus") for exhaust gas that is applied in an exhaust gas processing apparatus using a particulate carbonaceous adsorbent (hereinafter referred to as "adsorbent") and provided to equipment such as a boiler, sintering device, refuse incinerator, or the like that generates exhaust gas containing $SO_2$ gas and/or $NO_x$, HCl, HF, Hg (hereinafter referred to as "harmful substances in exhaust gas") and other harmful gases.

A dry desulfurization-denitration apparatus is composed of a desulfurization tower (adsorption tower) for adsorbing and removing harmful substances in the exhaust gas onto an adsorbent; a regeneration tower for heating and regenerating the adsorbent onto which the harmful substances are adsorbed; and a conveyance device for recirculating and conveying the adsorbent between the desulfurization tower and the regeneration tower. The adsorbent in the desulfurization tower comes in contact with the exhaust gas and adsorbs or decomposes the harmful substances in the exhaust gas while slowly descending from top to bottom. At the same time, dust in the exhaust gas is also collected by the filtering effects of the particulate adsorbent.

In order for the harmful substances or dust to be removed with consistently high efficiency, the adsorbent must flow downward at a uniform speed in the horizontal cross-section of the moving bed thereof. The adsorbent also generates heat of adsorption when adsorbing the harmful substances.

The generated heat of adsorption is usually carried off by the sensible heat of the exhaust gas passing through the adsorbent, and by the sensible heat of the adsorbent that is discharged from the desulfurization tower, but in locations where transfer of the adsorbent is stagnated, or in locations where the exhaust gas does not pass through with adequate speed, the amount of the generated heat exceeds that of the heat carried off, the temperature of adsorbent increases, and heat storage occurs, and when such heat storage occurs, the carbonaceous adsorbent can sometimes develop hot spots or ignite.

In the conventional dry desulfurization apparatus, various types of adsorbent discharging devices provided to the bottom of the desulfurization tower are designed in order to maintain high-efficiency removal of harmful substances or dust, and to prevent ignition or the occurrence of hot spots.

FIGS. 6 and 7 show examples of the structure of the desulfurization-denitration tower of a dry desulfurization apparatus in actual operation. The desulfurization-denitration apparatus shown in FIGS. 6 and 7 is provided with a hollow tower body 1, and an entrance part 2 and an exit part 3 for the exhaust gas X are provided to opposing front and rear side walls 1a, 1b, respectively, of the tower body 1.

An entrance louver 4 and an exit louver 5 are provided at a predetermined spacing at the center of the tower body 1, and an adsorbent A is packed between the louvers 4, 5. The adsorbent A is fed from the top end of the tower body 1, and a device 6 for discharging the adsorbent A is provided to the bottom end part of the tower body 1. In the example shown in FIG. 6, the discharging device 6 is composed of a belt conveyor.

The adsorbent A moves slowly downward in a packed state between the louvers 4, 5 according to the amount of discharging of the discharging device 6, and during this movement, the exhaust gas X flows sideways through the packed moving bed of the adsorbent A and thus comes in contact therewith, so that harmful substances are adsorbed thereon.

The desulfurization-denitration apparatus shown in FIG. 6 has a structure in which a middle louver 7 is provided between the entrance louver 4 and the exit louver 5, and the adsorbent A between the entrance louver 4 and the middle louver 7 (hereinafter referred to as "front chamber") moves at a speed that is different from that of the adsorbent A between the middle louver 7 and the exit louver 5 (hereinafter referred to as "rear chamber").

A throttle portion 8 that closes in an inverted square pyramid shape is formed above the discharging device 6, and partitions 9, the spacing between which is adjusted, are provided inside the throttle portion 8 so that the adsorbent A moves at a uniform speed through the packed bed above. As shown in the top view of FIG. 7, a plurality of partitions 9 is assembled in the X and Y directions so as to divide the inside of the throttle portion 8 into a grid.

However, in a structure such as the one described above, when the width of the throttle portion 8 in the X direction is too large in relation to the width of the belt conveyor that constitutes the discharging device 6, not only does the height of the throttle portion 8 increase, but numerous partitions 9 are needed, and the structure becomes complex.

Fabrication is therefore made difficult by the reduced spacing between the partitions 9 near the bottom end of the throttle portion 8, and movement of the adsorbent A can be stagnated by friction from the wall surfaces at the corners where the partitions 9 intersect in the X direction and Y direction.

Patent Document 1 proposes a desulfurization-denitration apparatus that is structured as shown in FIGS. 8 and 9. The desulfurization tower shown in these drawings has a tower body 1, entrance and exit parts 2, 3 for exhaust gas X, entrance and exit louvers 4, 5, a middle louver 7, and an exit hood part 10. Since the configuration of these components is essentially the same as in the conventional example shown in FIGS. 6 and 7, the same reference symbols are used to refer to portions that correspond to or are the same as in the conventional example, and no redundant description thereof will be given. Only the characteristic aspects will be described.

In this conventional desulfurization-denitration apparatus, the discharging devices 6a are composed of roll feeders, three of which being employed. The width of each of the discharging devices 6a in the X direction is substantially the same as the width of the portion in which the adsorbent A is packed, and the discharging speed in the X direction is thereby made uniform.

The three discharging devices 6a are arranged in the Y direction, and the thickness handled by each discharging device 6a is reduced. A throttle portion 8a for feeding the adsorbent A to the discharging devices 6a is provided with a side wall formed in a rectangular shape, and a plurality of partitions 9a provided inside the throttle portion 8a.

Discharging ports 9b opened at the top ends of the discharging devices 6a are structured so that one wall surface (partitions 9a or the side wall of the throttle portion 8a) thereof is vertical, and the adsorbent A moves at a uniform speed without stagnant regions forming.

In the desulfurization-denitration apparatus configured as shown in FIGS. 8 and 9, since a plurality of partitions 9 is not arranged in a grid in the throttle portion 8 as in the conventional example shown in FIGS. 6 and 7, the problems of structural complexity and difficulty of manufacture can be overcome. However, the conventional apparatus described above has the technical drawbacks described below.

Patent Document 1: Japanese Laid-open Patent Publication No. 2006-15281

SUMMARY OF THE INVENTION

Specifically, in the two conventional desulfurization-denitration apparatuses described above, a portion of the adsorbent A having a small particle diameter forms dust and leaks from the exit louver 5 into the exit hood part 10 that is formed between the exit louver 5 and the rear wall 1b of the tower body 1. A portion of the exhaust gas X not collected by the adsorbent A also forms dust and leaks into the exit hood part 10.

The dust of the adsorbent A that leaks in this manner falls to the bottom of the exit hood part 10, and since the bottom end of the exit louver 5 is in contact with the bottom part of the rear wall 1b of the tower body 1 in the conventional desulfurization-denitration apparatus, and there is no capability provided for discharging the settled dust, the dust accumulates at the bottom of the exit hood part 10.

Therefore, in order to overcome such problems, an entrainment port 11 may be provided for causing the dust to be drawn into the adsorbent A when dust of the adsorbent A that has leaked from the exit louver 5 and a portion of dust in the exhaust gas X not collected by the packed bed settles at the bottom.

However, the problems described below occur even when an entrainment port 11 is provided. The entrainment port 11 shown in FIG. 10 is formed by terminating the bottom end of the exit louver 5 at a distance from the rear wall 1b toward the inside so that a gap δ is provided between the exit louver 5 and the rear wall 1b. However, in an entrainment port 11 so structured, since the gap δ is formed vertically along the side wall of the throttle portion 8a, the flow of gas toward the exit part 3 causes the adsorbent A toward the top end of the entrainment port 11 to spray out. The present invention was developed in view of such problems of the prior art, it being an object thereof to provide a desulfurization-denitration apparatus for exhaust gas whereby adsorbent dust can be recovered without being sprayed.

The present invention for achieving the aforesaid object is a desulfurization-denitration apparatus for exhaust gas, comprising a desulfurization-denitration tower body, and an adsorbent discharging device provided to a bottom end part of the desulfurization-denitration tower body, wherein the desulfurization-denitration apparatus has at least an entrance louver and exit louver for forming a packed moving bed of the adsorbent moving in the vertical direction within the desulfurization-denitration tower; and a throttle portion provided with a side panel that is inclined toward the discharging device so as to form a gradually decreasing gap, the throttle portion being provided between the discharging device and the bottom end part of the desulfurization-denitration tower body; and at least one first partition is provided inside the throttle portion; the desulfurization-denitration apparatus for exhaust gas characterized in that a second partition extending along the incline direction of the side panel is provided at a predetermined distance from a bottom end of the exit louver above the side panel, and a gap is provided between the bottom end part of the exit louver and the side panel of the throttle portion.

According to the desulfurization-denitration apparatus for exhaust gas configured as described above, a second partition extending along the incline direction of the side panel is provided above the side panel, at a predetermined distance from a bottom end of the exit louver, a gap is provided between the bottom end part of the exit louver and the side panel of the throttle portion, and the gap is inclined along the incline of the side panel. Therefore, when dust of the adsorbent that has leaked from the exit louver and a portion of dust in the exhaust gas not collected by the packed moving bed settles at the bottom, the settled dust moves along the incline of the gap, and is recovered into the adsorbent that moves toward the discharging device.

In this case, even when gas is flowing toward the exit, since the gap is formed so as to incline along the side wall of the throttle portion, the adsorbent spraying caused by the flow of gas toward the exit part is prevented, and even when spraying occurs, the adsorbent moves back along the incline, and is recovered into the adsorbent moving toward the discharging device.

The vertical height of the second partition may be 0.2H or greater, preferably 0.3H or greater and 0.6H or less, with respect to the vertical height H of the first partition. When the vertical height of the second partition is less than or equal to two- or three-tenths the vertical height H of the first partition, a portion of the gas flow toward the exit part through the packed moving bed of the adsorbent circumvents the bottom end of the second partition, and because of the large amount of flow, the second partition is of insufficient length to prevent spraying of the adsorbent. When the ratio is 0.6 or higher, the circumventing gas flowing from the discharging device increases, and the sprayed matter not readily entrained.

The gap may be three or more times, preferably five or more times, the average particle diameter of the adsorbent. Since the likelihood of dust bridging the top end of the gap increases when the gap is three or less times the average particle diameter of the adsorbent, the gap is made three times, more preferably five or more times, the average particle diameter of the adsorbent.

Through the desulfurization-denitration apparatus for exhaust gas according to the present invention, adsorbent dust can be recovered without being sprayed, thus preventing the discharging device from being of greater complexity.

DETAILED DESCRIPTION OF THE INVENTION

Figure 1:
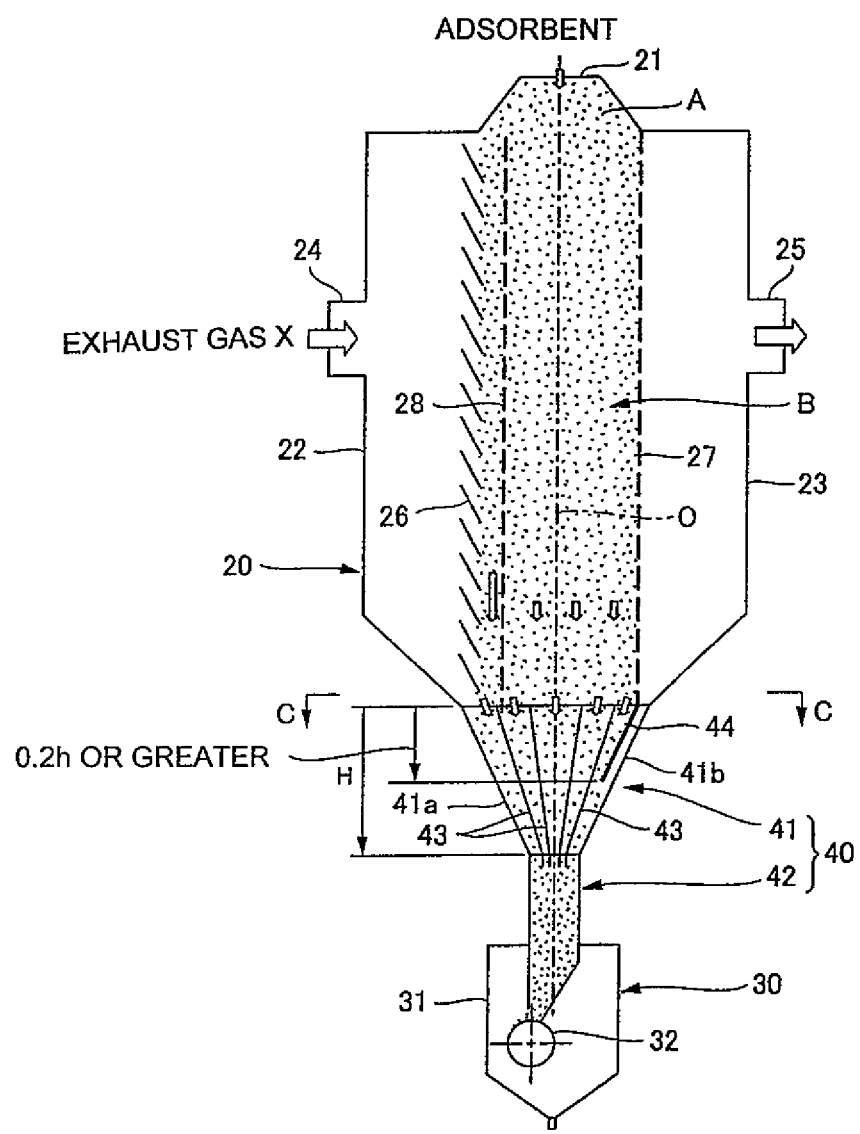
FIG. 1 is a longitudinal sectional view showing an embodiment of the desulfurization-denitration apparatus for exhaust gas according to the present invention.
Figure 2:
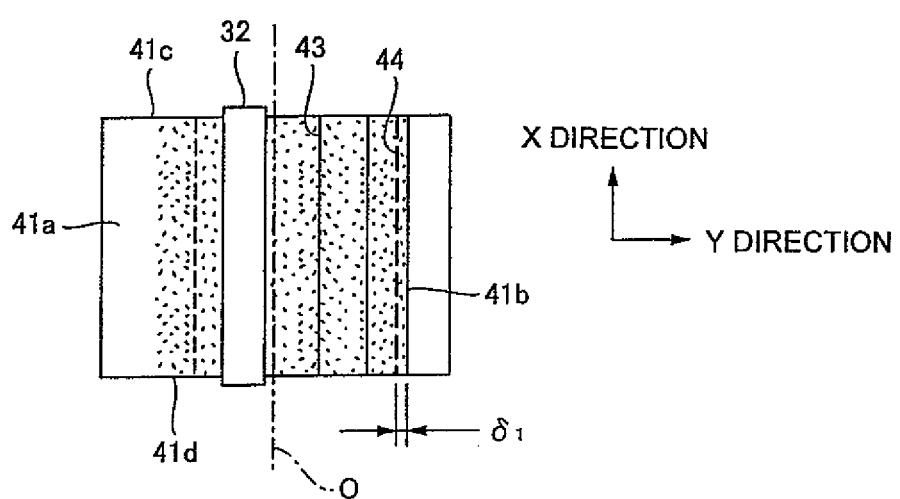
FIG. 2 is a view along line C-C of the apparatus shown in FIG. 1.
Figure 3:
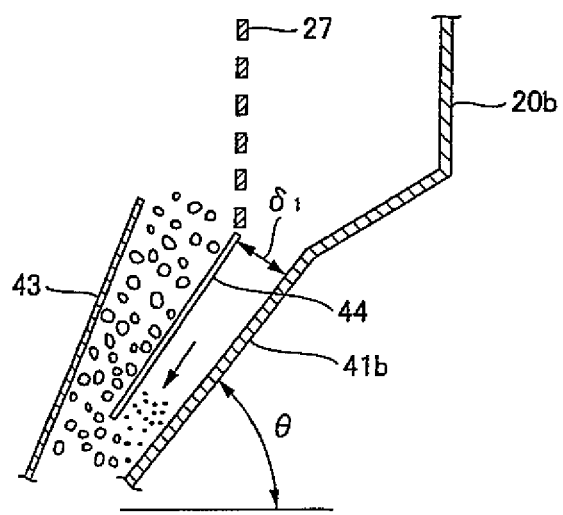
FIG. 3 is an enlarged view of a portion of the apparatus shown in FIG. 1.

Preferred embodiments of the present invention will be described in detail with reference to the accompanying drawings. FIGS. 1 through 3 show an embodiment of the desulfurization-denitration apparatus for exhaust gas according to the present invention.

The desulfurization-denitration apparatus for exhaust gas of the present embodiment is provided with a hollow box type desulfurization-denitration tower body 20, and an adsorbent A discharging device 30 disposed at the bottom end of the desulfurization-denitration tower body 20. In the desulfurization-denitration tower body 20, a charging port 21 for adsorbent A is provided at the top end, and an entrance part 24 and an exit part 25 for exhaust gas X are provided to the opposing front and rear walls 22, 23, respectively, of the tower body 20.

An entrance louver 26 and an exit louver 27 are provided at a predetermined spacing at the center of the tower body 20, and an adsorbent A is packed between the louvers 26, 27. The adsorbent A is fed from the charging port 21 at the top end of the tower body 20, and flows downward at a predetermined speed, whereby a packed moving bed B of the adsorbent A is formed in the central portion of the tower body 20.

In the present embodiment, a middle louver 28 is provided within the packed moving bed B, the moving bed B is divided into two parts in the axial direction, and the packed moving bed B moves at mutually different speeds between the entrance louver 26 and middle louver 28 and between the middle louver 28 and exit louver 27. The middle louver 28 is not necessarily needed, the packed moving bed B may be formed only between the entrance and exit louvers 26, 27, or a plurality of middle louvers may be provided and the packed moving bed B divided into three or more parts.

The adsorbent A in the packed moving bed B moves in a packed state between the louvers 26, 27 slowly downward according to the amount of discharging of the discharging device 30, and during this movement, exhaust gas X introduced from the entrance part 24 flows sideways through the packed moving bed B of the adsorbent A and thus comes in contact the adsorbent A, and harmful substances are adsorbed onto the adsorbent A.

In the present embodiment, a throttle portion 40 is provided between the discharging device 30 and the bottom end part of the tower body 20. The throttle portion 40 has a two-stage structure composed of a first throttle portion 41 that is integrally connected to the bottom end of the tower body 20, and a second throttle portion 42 that is connected to the first throttle portion 41.

The first throttle portion 41 is provided with a pair of left and right panels 41a, 41b inclined so that the spacing therebetween gradually decreases toward the discharging device 30, and suspended front and rear panels 41c, 41d for connecting the left and right panels 41a, 41b, and the first throttle portion 41 forms a funnel shape in which the spacing in the Y direction narrows toward the bottom.

Four first partitions 43 are provided inside the first throttle portion 41 thus formed. As shown in FIG. 2, the first partitions 43 have the same width as the packed moving bed B in the X direction and are inclined at a predetermined angle θ so that the bottom end is oriented in the direction of the central axis O of the packed moving bed B, and the first partitions 43 are not arranged in the Y direction.

Figure 6:
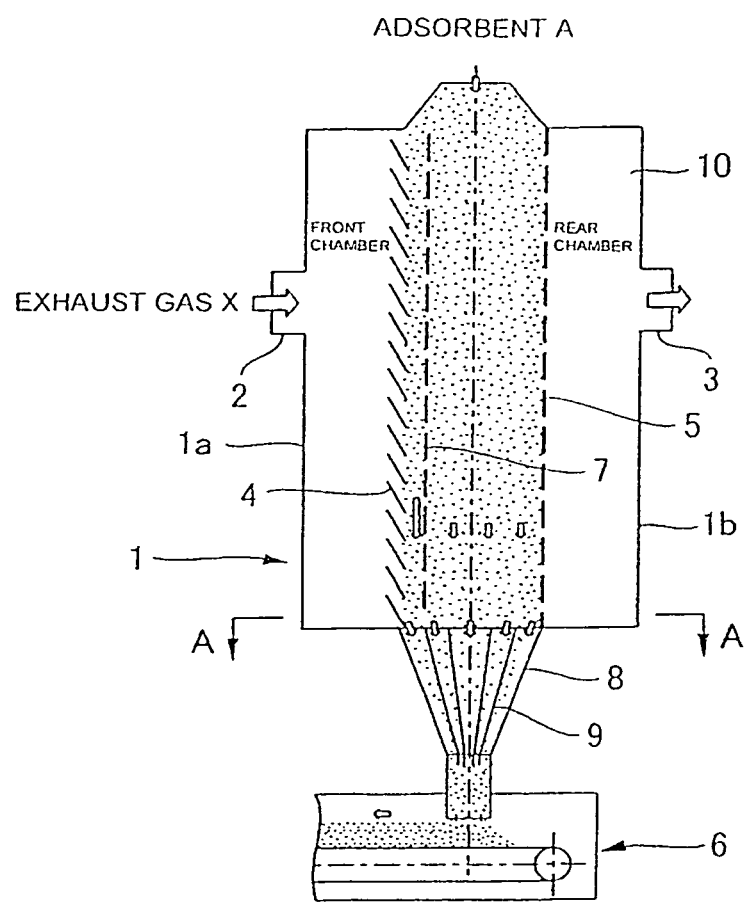
FIG. 6 is a longitudinal sectional view showing an example of the conventional desulfurization-denitration apparatus for exhaust gas.
Figure 7:
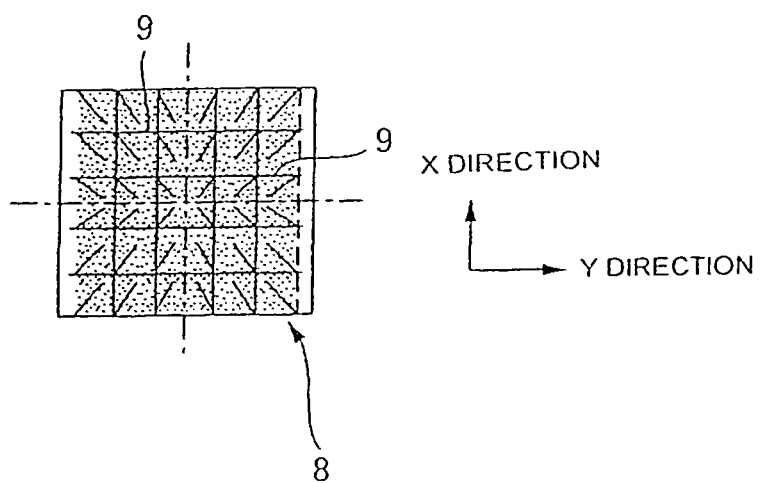
FIG. 7 is a view along line A-A of FIG. 6.

Through such an arrangement of the first partitions 43, there is no need for numerous partitions as in the conventional throttle portion shown in FIGS. 6 and 7, a complex structure can be prevented, the spacing in the X direction and Y direction is not reduced near the bottom end of the throttle portion, difficulties in fabrication can be eliminated, the partitions do not intersect in the X direction and Y direction, and there is no risk of the movement of the adsorbent A being impeded by friction from the wall surfaces. The present invention is not limited to the arrangement and number of first partitions 43 shown in FIG. 1, and the first partitions 43 may also be arranged in a grid as in the conventional example.

The second throttle portion 42 extends downward from the bottom end of the first throttle portion 41 in a tapered shape, and an opening at the bottom end thereof is placed above the discharging device 30. The opening at the bottom end of the second throttle portion 42 coincides with the length in the X direction of the discharging device 30. When the discharging device 30 is elongated in the X direction, the aforementioned front and rear panels 41c, 41d (arranged in the front and rear directions of the paper surface in FIG. 1) of the first throttle portion 41 may be inclined in the same manner as the left and right panels 41a, 41b rather than being arranged vertically.

The discharging device 30 in the present embodiment is composed of a hopper 31 that surrounds the outside of the bottom end of the second throttle portion 42, and a rotary feeder 32 that is provided inside the hopper 31. A discharge port is provided to the bottom end of the hopper 31, and the adsorbent A discharged from the discharge port is received by a conveyance device not shown in the drawing, and transported to a regeneration tower.

In the present embodiment, the length of the discharging device 30 and rotary feeder 32 in the X-axis direction is substantially the same as the width of the packed moving bed B of the adsorbent A in the X direction. A single discharging device 30 is provided in the Y direction.

Figure 8:
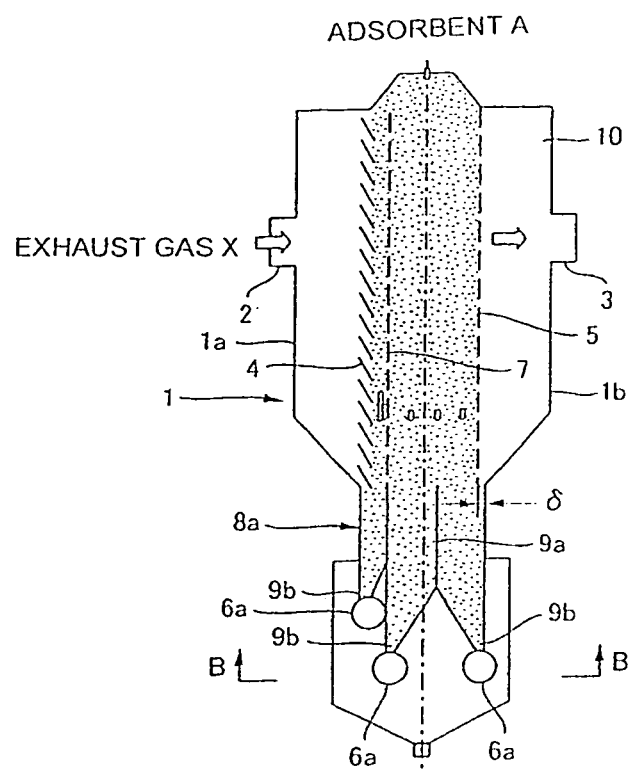
FIG. 8 is a longitudinal sectional view showing another example of the conventional desulfurization-denitration apparatus for exhaust gas.
Figure 9:
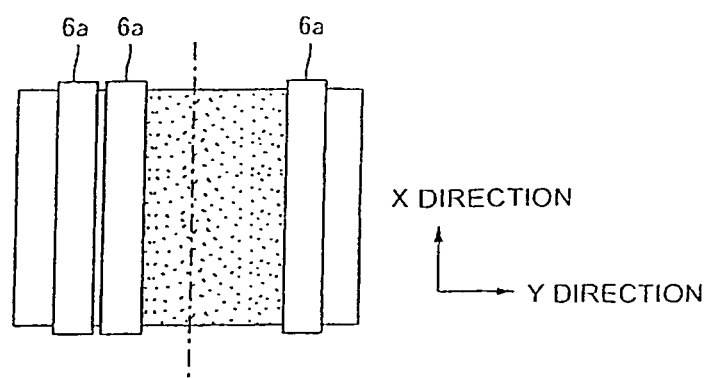
FIG. 9 is a view along line B-B of FIG. 8.
Figure 10:
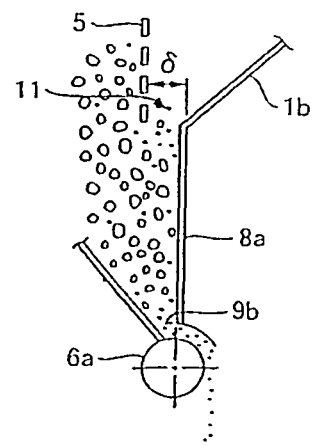
FIG. 10 is a view showing a case in which a dust entrainment port is provided to the apparatus shown in FIG. 8.

Using such a discharging device 30 prevents the number of discharging devices from increasing, such as in the conventional example shown in FIGS. 8 and 9, and since a plurality of discharging devices is not used, gas does not flow from the discharging device of the front chamber toward the discharging device of the rear chamber, and more than the necessary amount of the adsorbent A can be prevented from being discharged along with the flow of gas blown from the discharging port of the front-chamber discharging device. Moreover, the structure is not complicated by an increased number of discharging devices, nor is there any need for accompanying electrical equipment or instruments, and increased cost can be prevented. The present invention is also not limited to having only a single discharging device 30, and a plurality of discharging devices may be provided. In the present embodiment, the throttle portion 40 is provided with the structure described below in addition to the structure described above. A second partition 44 is provided in addition to the above-mentioned first partitions 43 inside the first throttle portion 41.

The details of the arrangement structure of the second partition 44 are shown in FIG. 3. The second partition 44 shown in FIG. 3 extends above a right side panel 41b of the throttle portion 40 at a predetermined distance from the bottom end of the exit louver 27, along the incline direction of the side panel 41b. By providing the second partition 44 such as described above, a gap δ1 is provided between the bottom end part of the exit louver 27 and the side panel 41b of the throttle portion 40.

In the throttle portion 40, the first partitions 43 extend along the entire length of the first throttle portion 41, but the top end of the second partition 44 is connected to the bottom end of the exit louver 27, and the bottom end part is terminated near the middle of the height of the first throttle portion 41.

In the present embodiment, by extending the second partition 44 parallel to the side panel 41b, the gap δ1 is formed so as to have the same length along the entire length of the second partition 44. The gap δ1 is also not necessarily of the same distance, but may narrow toward the bottom end insofar as the conditions described hereinafter are satisfied.

The size of the gap δ1 may be three or more times, preferably five or more times, the average particle diameter of the adsorbent A. When the gap δ1 is less than three times the average particle diameter of the adsorbent, stray adsorbent particles bridge and block the top end of the gap δ1, and entrainment of dust may be inhibited.

In this instance, bridging can be prevented by making the gap δ1 three or more times the average particle diameter of the adsorbent A, but since the adsorbent A includes particles having a diameter equal to or larger than the average particle diameter, the gap δ1 is preferably made five or more times larger than the average particle diameter in order to reliably prevent bridging.

In the present embodiment, the vertical height of the second partition 44 may be 0.2H or greater, preferably 0.3H or greater and 0.6H or less, with respect to the vertical height H (which is the same as the vertical height of the first throttle portion 41) of the first partitions 43).

The angle θ of the side panel 41b of the first throttle portion 41 in relation to the horizon is usually 50° to 70°. When the height of the second partition 44 is smaller than the thickness of the packed moving bed B of the adsorbent A in the Y direction, or the height H of the first throttle portion 41, gas flow from above the second partition 44 increases, and the amount of gas blown out from the bottom end of the second partition 44 increases.

Conversely, when the height of the second partition 44 is larger than the aforementioned thickness or the height H of the second partition 44, the diverted flow of gas from below the first partitions 43 increases, and the amount of gas that blows toward the gap δ1 from the bottom end of the second partition 44 accordingly increases. However, when the side panel 41b of the first throttle portion 41 is inclined at a large angle θ, there is no increase in the amount of gas blown out from the bottom end of the second partition 44 even when the second partition 44 has a large height. The height of the second partition 44 can thus be set to 0.2H to 1H.

However, since the amount of gas blown from below the second partition 44 is also affected by the number of first partitions 43 and the amount of dust included in the adsorbent A, it has been discovered as a result of various simulations that the amount of blown gas can be minimized by setting the height of the second partition 44 to 0.3H to 0.6H.

Specifically, as a result of various modeling experiments, the inventors showed that by making the height-direction position of the bottom end part of the second partition 44 as measured from the top end of the first throttle portion 41 0.2H or greater, preferably 0.3H or greater and 0.6H or less, with respect to the height H of the entire first throttle portion 41, it is possible for a portion of the gas that flows toward the exit louver 27 from the entrance louver 26 to minimize the sum of the amount of gas that flows between the second partition 44 and the side panel 41b and sprays from the top end of the gap δ1, and the amount of gas that flows down the gaps of the first partitions 43, reverses course at the bottom end parts of the first partitions 43, ascends between the second partition 44 and the side panel 41b, and sprays from the gap δ1.

Specifically, by thus minimizing the amount of gas that sprays from the top end of the gap δ1, the settled dust in the exit hood part can be entrained into the adsorbent moving bed without a plurality of discharging ports being provided, as in the conventional example shown in FIGS. 8 and 9.

Figure 4:
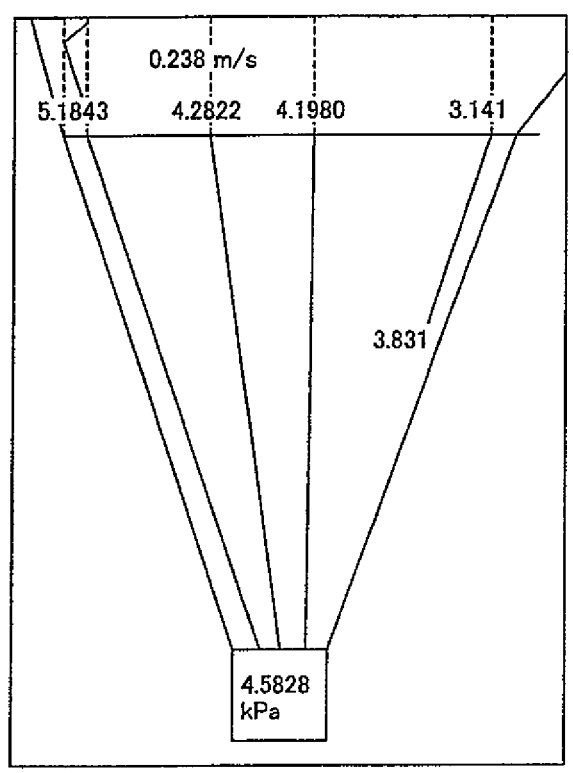
FIG. 4 is a view showing a simulation model used to confirm the effects of the present invention.
Figure 5:
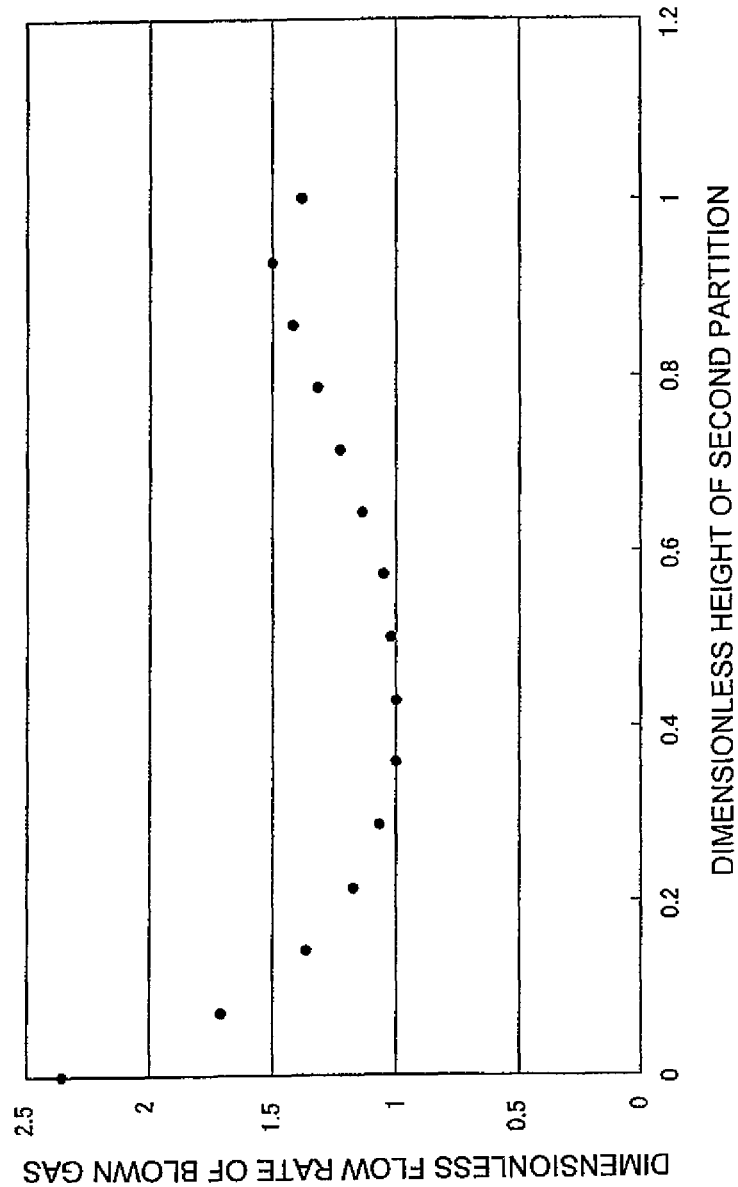
FIG. 5 is a graph showing the results of a simulation using the model shown in FIG. 4.

FIG. 4 is a view showing a model used for simulation. In the model shown, the first throttle portion 41 was divided into eight parts, and the ratio of the cross-sectional area thereof was repeatedly computed so as to make each linear velocity constant. FIG. 5 shows the relationship between the height of the second partition 44 and the computed flow rate of blown gas when the height was varied. It was confirmed from the results shown in FIG. 5 that the gas flow rate was minimized by setting the height of the second partition 44 to 0.2H or greater to 0.3H or greater and 0.6H or less with respect to the height H of the entire first throttle portion 41.

According to the desulfurization-denitration apparatus for exhaust gas configured as described above, a second partition 44 extending along the incline direction of the side panel 41b is provided above the side panel 41b, at a predetermined distance from the bottom end of the exit louver 27, a gap δ1 provided between the bottom end part of the exit louver 27 and the side panel 41b of the throttle portion 41, and the gap δ1 is inclined along the incline of the side panel 41b. Therefore, when dust of the adsorbent A that has leaked from the exit louver 27 and a portion of dust in the exhaust gas not collected by the packed moving bed B settles at the bottom, the settled dust moves along the incline of the gap δ1, and is recovered into the adsorbent A that moves toward the discharging device 30.

In this case, even when gas is flowing toward the exit, since the gap δ1 is formed so as to incline along the side wall 41b of the throttle portion 41, spraying of the adsorbent A caused by the flow of gas toward the exit part is prevented.

The desulfurization-denitration apparatus for exhaust gas according to the present invention enables adsorbent dust to be recovered without being sprayed, and can therefore be effectively utilized in the field of exhaust gas processing.

The invention claimed is:

1. A desulfurization-denitration apparatus for exhaust gas, comprising:
    a desulfurization-denitration tower body;
    an adsorbent discharging device;
    an entrance louver and an exit louver within said tower body for delimiting a passage area of a packed moving bed of an adsorbent that moves in a vertical direction within said tower body; and
    a two stage throttle portion coupled to a bottom of the tower body for providing a path for adsorbent falling through the tower body to exit to the adsorbent discharging device, the two stage throttle portion including a first stage extending from the bottom of the tower body toward the adsorbent discharging device and a second stage extending from a bottom of the first stage toward the adsorbent discharging device, the first stage having opposing inclined first and second walls and having opposing third and fourth walls, said first, second, third and fourth walls defining a perimeter of the first stage and extending vertically downward from a common height at the bottom of the tower body; and
    wherein internal volume of all structure of the first stage within the perimeter consists of a plurality of first partitions and a second partition, said adsorbent falling through said internal volume;
    wherein each first partition of the plurality of first partitions extends between said third wall and said fourth wall without contacting any of said first wall, second wall, tower body, and louvers, wherein said each first partition is spaced apart and extends vertically downward from said common height toward said second stage at a different vertical incline from all other of said plurality of first partitions;
    wherein the second partition defines a single plane and extends vertically downward from said common height starting at a lower end of the exit louver; and wherein said single plane is parallel to one wall of said inclined first wall and inclined second wall and is spaced apart from and between each of said one wall and a nearest one of the plurality of first partitions closest to said one wall so that a spacing between said second partition and said one wall is constant along a vertical span of said second partition.

2. The desulfurization-denitration apparatus according to claim 1, wherein the spacing between said second partition and said one wall spans at least 3 times an average particle diameter of the adsorbent.

3. The desulfurization-denitration apparatus according to claim 1, wherein a vertical height of said second partition is 0.2H or greater than a vertical height H of said plurality of first partitions.

4. The desulfurization-denitration apparatus according to claim 1 wherein the spacing between said second partition and said one wall spans at least five times an average particle diameter of said adsorbent.

5. The desulfurization-denitration apparatus according to claim 1, wherein a vertical height of said second partition is 0.3H or greater than a vertical height H of said plurality of first partitions.

6. The desulfurization-denitration apparatus according to claim 1, wherein a vertical height of said second partition is no greater than 0.6H with respect to a vertical height H of said plurality of first partitions.

* * * * *